Figure 1:
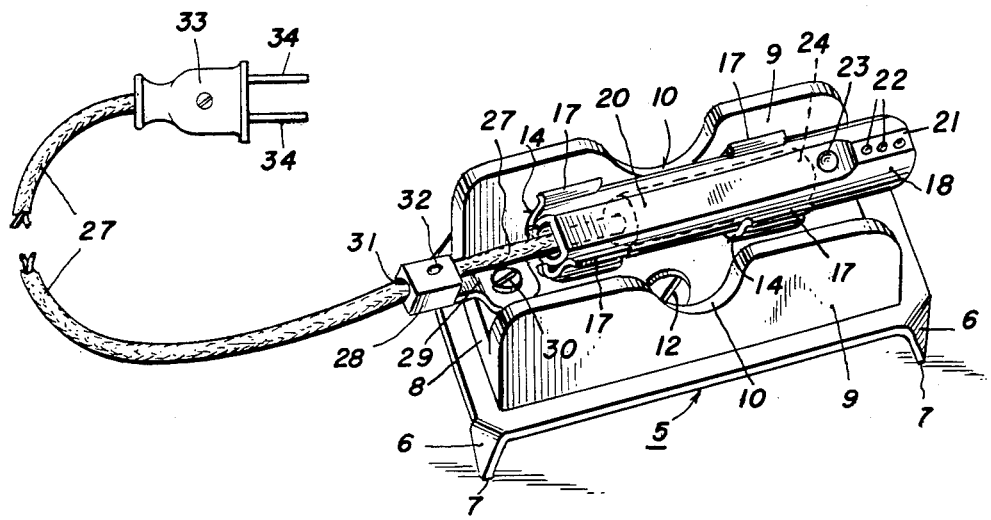

Nov. 4, 1952  E. K. SYRSTAD  2,617,006
WATCHMAKER'S APPLIANCE
Filed July 31, 1951

INVENTOR
EYVIND K. SYRSTAD, DECEASED
BY MAMIE SYRSTAD, Co-EXECUTOR

BY  J. N. Trundle
ATTORNEY

Patented Nov. 4, 1952

2,617,006

UNITED STATES PATENT OFFICE 2,617,006

WATCHMAKER'S APPLIANCE

Eyvind K. Syrstad, deceased, late of Lancaster, Pa., by Mamie Syrstad, co-executor, Lancaster, Pa.

Application July 31, 1951, Serial No. 239,578

7 Claims. (Cl. 219—19)

The present invention relates to a watchmaker's appliance, and especially to a pallet heater which is adapted to be used in the repair of various parts of watches such as pallet levers and rollers.

One object is to provide an electrically heated appliance for use in heating the pallet lever while setting or adjusting the pallet stones.

Another object is to provide an electrical heating device for heating conventional pallet lever clamps which heretofore have been held above an alcohol flame to enable the plastic material in which the stones are set in the pallet lever to be replaced, adjusted or otherwise repaired.

Another object is to provide an electric heating device which is shaped to conveniently accommodate a pallet lever clamp in such a manner that the pallet stones held thereby may be adjusted or replaced without exposing the pallet lever to the action of a direct flame, which would be liable to cause blueing or oxidation of the lever or otherwise disfiguring the same.

Another object is to provide an electric heater for combination pallet heaters in which the pallet lever is clamped in position so that the stones can be adjusted after the plastic has become slightly melted, and to provide said electric heater with cut away portions to accommodate the adjusting arms of the pallet lever heater and clamp and to provide recesses in the electric heating element to receive various rivets and the like on the conventional combination clamp and pallet heater.

Another object is to provide an electric heating appliance which can be conveniently placed upon a watchmaker's table or bench and can be readily connected to a source of electrical energy by an attachment plug and can be removed and stored when not in use.

Another object is to provide an electric heater for combination pallet heater clamps which is provided with a tubular supporting member having pre-shaped surfaces for supporting pallet heater clamps, and which is easily removable from its supporting base and electric heating element to enable the same to be cleaned, and to permit the removal of the tubular support and pallet heater and clamp when various adjustments are being made to the pallet stones, or when the pallet heater clamp is positioned on the supporting tube.

Another object is to provide an electric appliance for pallet lever heater clamps which is provided with a base having ends adapted to frictionally engage the workbench surface, and which is provided with an electric heating element of cylindrical shape which is adapted to be received in the central bore of the tubular supporting member, the tubular supporting member being yieldingly and frictionally held in place by a pair of spaced apart spring gripping members, and the heating element freely or floatingly mounted within the tubular supporting member.

Another object is to provide an electrical heating appliance of the above mentioned character in which the current carrying cable or conductor for the heating element is anchored to the supporting base such that the tubular supporting member may be conveniently displaced from its operative position between the spring gripping members without causing the combination clamp and heater supported thereon from being displaced.

Other objects and advantages of the invention will become apparent during the course of the following description of the accompanying drawing wherein:

Figure 1 is a perspective view of the electric heating appliance showing the manner in which the removable pallet heater clamp can be accommodated on the upper flat surface of the support.

Figure 2:
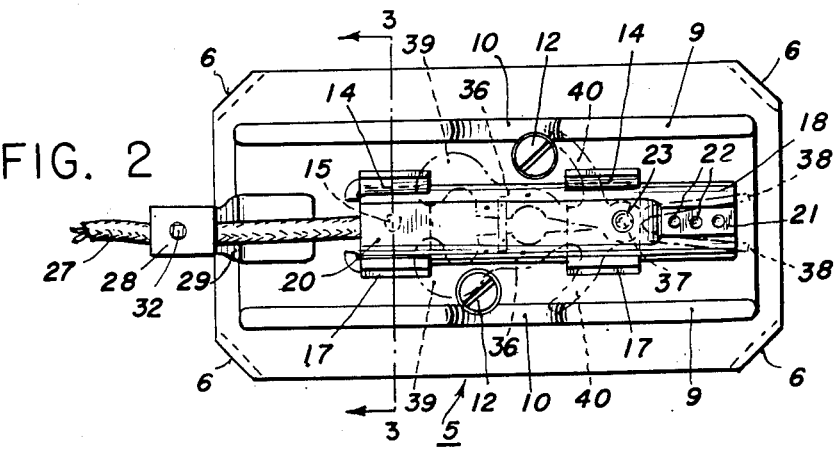
Figure 3:
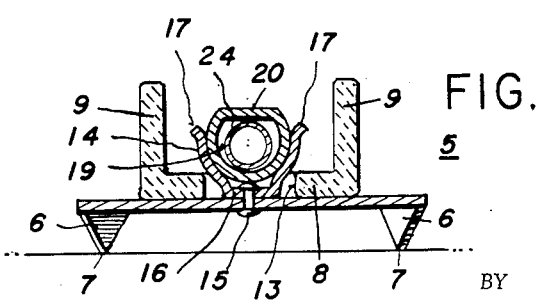

Figure 2 is a top elevational view of the electric heater appliance for heating pallet lever clamps and heaters and illustrates the manner in which such a lever is positioned from the supporting member with its arms accommodated in openings or recesses in the sides of the appliance, there being shown a conventional combination pallet lever heater and clamp of conventional design in dotted lines and Figure 3 is a vertical cross-sectional view taken on line 3—3 of Figure 2 and looking in the direction of the arrows to illustrate various structural details and the manner in which the tubular supporting member is yieldingly and frictionally held in position.

In the drawing, and more in detail, there is shown an electric heating appliance for heating so-called combination pallet lever holding clamps and heaters. The device includes a metal base member 5 formed of a flat metallic rectangular plate having the corner edges bent downwardly as at 6 to form pointed table surface gripping members 7. Secured to the base 5 is a porcelain insulator unit having a lower wall 8 provided along the side edges with spaced vertical walls 9. The vertical walls 9 are provided with opposed cut away portions 10 to accommodate the adjusting wings on a pallet setting and adjusting tool. The porcelain insulating unit may be formed of other material which is resistant to electrical and high temperature conditions, and, if desired, can be formed of Bakelite or other phenol condensation products. The porcelain insulator unit or housing including the bottom wall and side members 9, is anchored to the base 5 by means of retaining screws 12 which are passed through suitable alined openings in the bottom wall 8 of the housing unit and base 5 so as to receive retaining nuts on their opposite ends (not shown).

Secured to the base 5 and projecting through openings 13 in the base 8 of the insulator housing is a pair of spring clip members 14 which are anchored to the base 5 by rivets or the like 15 as shown in Figure 3. The spring clips 14 are identical in construction, and hence a description of one will suffice for both. Each clip comprises a flat base portion 16 having arcuate opposed arms 17 which are adapted to frictionally grip a tubular supporting member 18 having a central bore 19 for accommodating an electric heating element which will be more fully described hereinafter.

The tubular supporting member 18 is machined to provide a flattened surface 20 which extends from one end of said tubular support to a point adjacent the other end, where it is only slightly flattened as at 21 and provided with a series of spaced recesses 22. The flattened portion 20 is provided adjacent one end thereof with a round recess or depression 23 for accommodating the rivet of a pallet setting and adjusting tool forming the pivot between the clamping members thereof as shown in the Garnett Patent 956,956, issued May 3, 1910.

The electric heating element is cylindrical and is provided with a metal sheet 24 of a diameter slightly smaller than the diameter 19 of the opening or bore in the tubular supporting member 18. The electric heating element 24 includes a resistance wire (not shown) mounted within the metal sheath 24 suitably insulated therefrom by asbestos or the like in a conventional manner. The terminals of the electric resistance element are connected to a double cable or conductor cord 27 and said cord is anchored to the insulated housing unit 8—9 by means of a cable clamp 28, which is provided with a bracket 29 securely held in place by a retaining screw 30. The cable clamp 28 is formed integral with the bracket 29 and has an opening 31 through which the cable 27 passes so that the same may be held in place by an Allen screw 32 received in a correspondingly threaded opening in the cable clamp 28. The opposite end of the cable or appliance cord 27 is provided with a fixture plug 33 having contacts or prongs 34 which are adapted to be inserted in correspondingly shaped female socket openings in a wall plug connected to a source of electrical energy.

In operation, the electric heating appliance is used in connection with a pallet setting and adjusting tool as shown in the Garnett Patent 956,956, issued May 3, 1910, and such a tool is shown in dotted lines in Figure 3. For the purpose of convenience in illustration the pallet lever holding tool comprises arms 36 which are pivoted together by a rivet 37, and leaf springs are provided for yieldingly urging the levers 36 together. The leaf springs are mounted between handle portions 38 and the pallet lever is held in notches in the lever arms 36, while the pallet stones are being heated to melt the plastic setting thereof during setting or repairing. The levers 36 are provided with enlarged wing portions 39 which are normally of a heat conducting metal and are arranged to be placed over an alcohol flame such that heat by conduction will heat the levers 36 and melt the pallet stone setting material so that the stones can be adjusted, displaced and replaced. Gripping levers are formed to engage the pallet stones when held by the tool and such levers are movable over arcuate arms 40 which are graduated by delineation markings so that the adjusting levers (not shown) will grip the stones on the pallet lever and hold them in their proper position while being set.

The pallet heater as indicated by dotted lines in Fig. 2, is placed on the tubular support 18 so that the rivet head 37 is received in the opening 23 and the handle portions 38 extend along opposite sides of the flattened portion 21. In this position, the pallet stone setting tool may be arranged so that the arcuate arms 40 are received in the recesses 10 of the insulating block or porcelain housing unit 8—9. When a pallet lever is supported by the levers 36 of the pallet setting and adjusting tool, and the tool is placed on the flat portion 20 of the tubular support 18, the heat from the electric heating element 24 will be conducted to the levers 36 so that the plastic setting material in the notches of the pallet lever will be heated so that the stones can be replaced or adjusted. If desired, the pallet setting and adjusting tool can be removably secured to the support 18 by a spring clip or the like (not shown).

If it is desired to remove the tubular supporting element 18 with the pallet setting and adjusting tool or heater, said tube 18 is slid longitudinally so as to displace the same from the yielding gripping clips 17. When the tubular support 18 is removed in this manner, the electric heating unit 24 remains in position with respect to the porcelain housing 8—9 by reason of the anchor clamp 28. Thus, the tubular support and the pallet setting adjusting tool can be displaced to permit the plastic material in which the pallet stones are set to be divorced from the heating element and placed upon the watchmaker's table for cooling and setting of the plastic material.

While the invention has been described in connection with the pallet heater shown in the Garnett patent, it is obvious that the same can be used in connecion with pallet heaters and pallet setting and adjusting tools of various other types having similar characteristics.

What is claimed is:

1. In an electric heating appliance for pallet stone setting tools, a base, a pair of spring clips secured to the base in spaced apart relation, an electric heating element flexibly connected to the base, and a tubular support removably held between said clips with the heating element received in the bore thereof.

2. In an electric heating appliance for pallet stone setting tools, a base, a pair of spring clips secured to the base in spaced apart relation, an electric heating element flexibly connected to the base, and a tubular support removably held between said clips with the heating element received in the bore thereof, said tubular supporting member being provided with a flattened surface to accommodate the pallet stone setting tool.

3. In an electric heating appliance for pallet stone setting tools, a base, a pair of spring supporting clips secured to the base in spaced apart relation, an electric heating element having a cord conductor adapted to be disposed between said clips, means for securing said cord conductor to the base, and a tubular supporting member adapted to receive said supporting element, said tubular supporting member being provided with a flattened surface extending the major portion of its length for accommodating said pallet stone setting tool.

4. In an electric heating appliance for pallet stone setting tools, a base, a pair of spring supporting clips secured to the base in spaced apart relation, an electric heating element having a cord conductor adapted to be disposed between said clips, means for securing said cord conductor to the base, and a tubular supporting member adapted to receive said supporting element, said tubular supporting element being provided with a flattened portion having a recess at one end thereof for accommodating a pallet stone setting tool.

5. In an electric heating device for pallet stone setting tools, a base having friction members for holding the same in position, a porcelain housing unit mounted on said base having side walls provided with cut away portions, a pair of yielding spring clips secured to said base in spaced apart relation, an electric heating element disposed between said spring clips, an electrical cord conductor for said heating element anchored to said base and a tubualr supporting member adapted to receive said heating element and be removably held in position between said spring clips.

6. In an electric heating device for pallet stone setting tools, a base having friction members for holding the same in position, a porcelain housing unit mounted on said base having side walls provided with cut away portions, a pair of yielding spring clips secured to said base in spaced apart relation, an electric heating element disposed between said spring clips, an electrical conductor cord for said heating element, a clamp secured to said base for receiving said conductor cord to hold the same in position, and a tubular supporting member having a central bore adapted to receive said heating element and be removably held in position between said spring clips, said tubular supporting member being provided with a flattened portion and having a recess at one end thereof for accommodating a pallet stone setting tool.

7. In an electric heating device for pallet lever heaters and stone setting tools, a base having friction gripping members at the corner edges thereof for holding said base against sliding movement on a support, a porcelain housing unit mounted on said base having side walls provided with cut away portions for accommodating extensions on said pallet heater, a pair of U-shaped yielding spring clips secured to said base in spaced apart relation, an electric heating unit disposed between said spring clips with its heating element connected to an electrical conductor cord, a conductor cord clamp secured to said base for receiving said conductor cord and clamping the same in position and a tubular support having a central bore for receiving said electric heating unit and being adapted to be removably held between said spring clips, said tubular support being provided with a flattened portion having a recess at one end for accommodating said pallet heater and pallet stone setting tool.

MAMIE SYRSTAD,
*Co-executor of the Estate of Eyvind K. Syrstad, Deceased.*

REFERENCES CITED

The following references are of record in the file of this patent:

UNITED STATES PATENTS

| Number | Name | Date |
|---|---|---|
| 751,439 | Smith | Feb. 2, 1904 |
| 817,955 | Brosius | Apr. 17, 1906 |
| 956,956 | Garnett | May 3, 1910 |
| 1,140,864 | Aubery | May 25, 1915 |
| 1,261,716 | Culman | Apr. 2, 1918 |
| 1,445,595 | Jarrell et al. | Feb. 23, 1923 |
| 1,732,502 | Cox | Oct. 22, 1929 |
| 2,230,665 | Green | Feb. 4, 1941 |
| 2,454,576 | Slack | Nov. 23, 1948 |